(12) United States Patent
Kim

(10) Patent No.: US 11,367,066 B2
(45) Date of Patent: Jun. 21, 2022

(54) WALLET RECOVERY METHOD

(71) Applicant: Coinbase, Inc., San Francisco, CA (US)

(72) Inventor: Peter Jihoon Kim, San Francisco, CA (US)

(73) Assignee: Coinbase, Inc., San Francisco, CA (US)

( * ) Notice: Subject to any disclaimer, the term of this patent is extended or adjusted under 35 U.S.C. 154(b) by 153 days.

(21) Appl. No.: 16/456,963

(22) Filed: Jun. 28, 2019

(65) Prior Publication Data
US 2020/0005282 A1 Jan. 2, 2020

Related U.S. Application Data

(60) Provisional application No. 62/691,097, filed on Jun. 28, 2018.

(51) Int. Cl.
*G06Q 20/36* (2012.01)
*H04L 9/06* (2006.01)
(Continued)

(52) U.S. Cl.
CPC ....... *G06Q 20/3674* (2013.01); *G06Q 20/065* (2013.01); *G06Q 20/3672* (2013.01);
(Continued)

(58) Field of Classification Search
CPC ........... G06Q 20/3674; G06Q 20/3672; G06Q 20/065; G06Q 2220/00; H04L 9/0637;
(Continued)

(56) References Cited

U.S. PATENT DOCUMENTS 7,298,240 B2 * 11/2007 Lamar ................ B25F 5/00
340/5.6
9,898,734 B2 * 2/2018 Ren ................ G06Q 20/3674
(Continued)

FOREIGN PATENT DOCUMENTS

CN 108234133 B * 12/2020 ......... G06Q 20/3829

OTHER PUBLICATIONS

"A Social-Network-Based Cryptocurrency Wallet-Management Scheme"; Shuangyu He, Qianhong Wu, (Member, IEEE), Xizhao Luo, Zhi Liang, Dawei Li, Hanwen Feng, Haibin Zheng and Yanan Li; 2169-3536 2018 IEEE. (Year: 2018).*
(Continued)

*Primary Examiner* — John W Hayes
*Assistant Examiner* — Edgar R Martinez-Hernandez
(74) *Attorney, Agent, or Firm* — Banner & Witcoff, Ltd.

(57) ABSTRACT

Systems and methods for blockchain wallet recovery, including: receiving a wallet recovery request from a user; sending a signed recovery transaction to the wallet, the signed recovery transaction comprising recovery instructions; and providing wallet access to the user, according to the recovery instructions, when a recovery condition is met. In examples, the recovery transaction is signed by a recovery key, different from a set of old wallet owner keys, that is associated with the wallet; the recovery instructions include new owner address(es) associated with a set of new owner keys; and providing wallet access includes activating the new owner addresses for the wallet after the recovery transaction is verified as signed by the recovery key.

20 Claims, 6 Drawing Sheets

(51) Int. Cl.
*H04L 9/08* (2006.01)
*G06Q 20/06* (2012.01)
*H04L 9/32* (2006.01)

(52) U.S. Cl.
CPC .......... *H04L 9/0637* (2013.01); *H04L 9/0825* (2013.01); *H04L 9/0894* (2013.01); *H04L 9/321* (2013.01); *H04L 9/3239* (2013.01); *H04L 9/3247* (2013.01); *G06Q 2220/00* (2013.01); *H04L 2209/38* (2013.01); *H04L 2209/56* (2013.01)

(58) Field of Classification Search
CPC ..... H04L 9/0825; H04L 9/0894; H04L 9/321; H04L 9/3247; H04L 9/3239; H04L 2209/56; H04L 2209/38
See application file for complete search history.

(56) References Cited

U.S. PATENT DOCUMENTS

| | | | | |
|---|---|---|---|---|
| 10,304,045 | B2* | 5/2019 | Kutsch | G06Q 20/401 |
| 2003/0014372 | A1* | 1/2003 | Wheeler | H04L 9/3231 |
| | | | | 705/71 |
| 2007/0179903 | A1* | 8/2007 | Seinfeld | G06Q 20/3674 |
| | | | | 705/67 |
| 2010/0211831 | A1* | 8/2010 | Fujiyama | H04L 41/06 |
| | | | | 714/57 |
| 2010/0325732 | A1* | 12/2010 | Mittal | H04L 9/0833 |
| | | | | 380/278 |
| 2012/0213368 | A1* | 8/2012 | Falk | H04L 63/08 |
| | | | | 380/270 |
| 2013/0036048 | A1* | 2/2013 | Campos | G06Q 20/36 |
| | | | | 705/41 |
| 2013/0110658 | A1* | 5/2013 | Lyman | G06Q 20/327 |
| | | | | 705/18 |
| 2014/0258110 | A1* | 9/2014 | Davis | G06Q 30/0611 |
| | | | | 705/41 |
| 2015/0324789 | A1* | 11/2015 | Dvorak | H04L 9/3297 |
| | | | | 705/67 |
| 2017/0005804 | A1* | 1/2017 | Zinder | H04L 63/123 |
| 2017/0103385 | A1* | 4/2017 | Wilson, Jr. | H04L 67/104 |
| 2017/0316391 | A1 | 11/2017 | Peikert et al. | |
| 2018/0075453 | A1* | 3/2018 | Durvasula | G06Q 20/3829 |
| 2018/0137512 | A1* | 5/2018 | Georgiadis | H04L 9/3239 |
| 2018/0191503 | A1* | 7/2018 | Alwar | G06Q 20/10 |
| 2018/0293557 | A1* | 10/2018 | Kim | G06Q 20/3823 |
| 2018/0315027 | A1* | 11/2018 | Kumar | G06Q 20/3825 |
| 2019/0028276 | A1* | 1/2019 | Pierce | G06Q 20/02 |
| 2019/0229926 | A1* | 7/2019 | Handa | G06Q 20/401 |
| 2019/0280866 | A1* | 9/2019 | Zhuang | G06Q 20/36 |
| 2020/0119916 | A1 | 4/2020 | Pickhardt | |
| 2020/0145192 | A1 | 5/2020 | Elkhiyaoui et al. | |
| 2020/0151716 | A1* | 5/2020 | Madisetti | H04L 9/3236 |
| 2020/0273025 | A1* | 8/2020 | Sharma | H04L 9/0637 |
| 2021/0083872 | A1* | 3/2021 | Desmarais | G06Q 20/3829 |

OTHER PUBLICATIONS

"Security of Distributed Ledger Solutions Based on Blockchain Technologies"; Marek R. Ogiela, Michael Majcher; 2018 IEEE 32nd International Conference on Advanced Information Networking and Applications (Year: 2018).*

Machine translation CN-108234133-B; "Method and system for changing keys of digital currency wallets"; Yao Qian; People's Bank of China Digital Currency Research Institute; Dec. 28, 2017; (Year: 2017).*

"International Search Report and Written Opinion of the ISA, dated Sep. 19, 2019, for application No. PCT/US19/39851."

A new era for crypto security—Unprecedented protection for your cryptocurrency wallet, Dec. 21, 2018, https://medium.com/argenthq/a-new-era-for-crypto-security-57909a095ae3.

Argent—Secure, Simple and Seedless—A new model for decentralised wallet recovery, Sep. 4, 2018, https://medium.com/argenthq/decentralised-and-seedless-wallet-recovery-5fcf7dddd78d.

Fund Recovery, Mar. 22, 2018, https://github.com/gnosis/fund-recovery/blob/master/README.md#paralysis-proof--time-lock-recovery--last-resort-recovery.

Making Sense of Ethereum's Layer 2 Scaling Solutions: State Channels, Plasma and Truebit, Feb. 12, 2018, https://medium.com/l4-media/making-sense-of-ethereums-layer-2-scaling-solutions-state-channels-plasma-and-truebit-22cb40dcc2f4.

Paralysis Proofs: How to Prevent Your Bitcoin From Vanishing, Jun. 13, 2019, hackingdistributed.com/2018/01/18/paralysis-proofs/.

Timelock—Bitcoin Wiki, Jun. 12, 2019, https://en.bitcoin.it/wiki/Timelock.

Feb. 2, 20225—(EP) European search report and examiner's search opinion—App. No. EP 19827540.6.

* cited by examiner

WALLET RECOVERY METHOD

CROSS-REFERENCE TO RELATED APPLICATIONS

This application claims priority to US Provisional Application No. 62/691,097 filed 28-Jun.-2018, which is incorporated herein its entirety by this reference.

TECHNICAL FIELD

This invention relates generally to the cryptocurrency field, and more specifically to a new and useful method for wallet control recovery in the cryptocurrency field.

BACKGROUND

Conventionally, if the private key(s) associated with a cryptocurrency wallet are lost, an owner cannot recover access to the wallet and loses the ability to transact from the wallet.

Thus, there is a need in the cryptocurrency field to create a new and useful wallet control recovery method. This invention provides such new and useful wallet control recovery method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
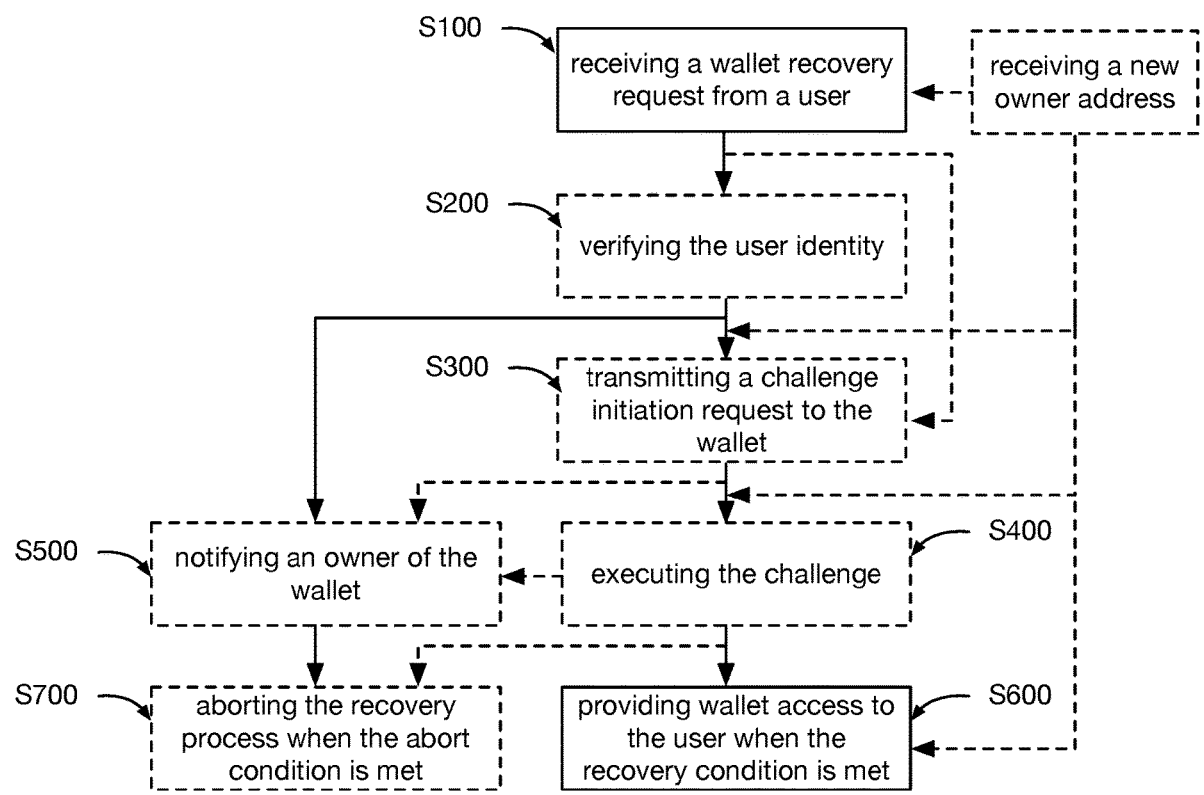
FIG. 1 is a flowchart representation of the wallet access recovery method.

As shown in FIG. 1, the method for wallet recovery includes at least one of: receiving a wallet recovery request from a user S100; and providing wallet access to the user when a recovery condition is met S600. The method can optionally include: verifying the user identity S200; transmitting a challenge initiation request to the wallet S300; executing the challenge S400; notifying an owner of the wallet S500; and aborting the recovery process when an abort condition is met S700. In some variations, the method functions to restore wallet access to a verified wallet owner when the wallet keys are partially or entirely lost or compromised.

In a first variation, the method for wallet recovery includes: receiving a wallet recovery request from a user (or several users); and providing wallet access to the user (or users) when a recovery condition is met. The wallet recovery request can be a signed recovery blockchain transaction that identifies a new public key of an owner account that can be used to sign transactions from the wallet, and wallet access can be provided to the user (or users) responsive to validation of the signed recovery blockchain transaction. Providing access can include recovering the wallet by adding the new public key to a set of owner accounts that can control wallet operation of the wallet.

In a first implementation, receiving a wallet recovery request can include receiving, from each of a plurality of wallet owner user devices, a recovery blockchain transaction signed by a private key of the wallet owner device. Each signed recovery blockchain transaction can identify the new public key. In variants, the recovery condition can include a determination that each signed recovery blockchain transaction identifies the same new public key. In some implementations, wallet recovery is performed in response to receiving signed recovery transactions from a predetermined number of owner devices (each transaction being signed with a different private key). In some implementations, the predetermined number is different from a number of wallet owner signatures required to allow a transaction from the wallet, but can alternatively be the same.

Figure 2:
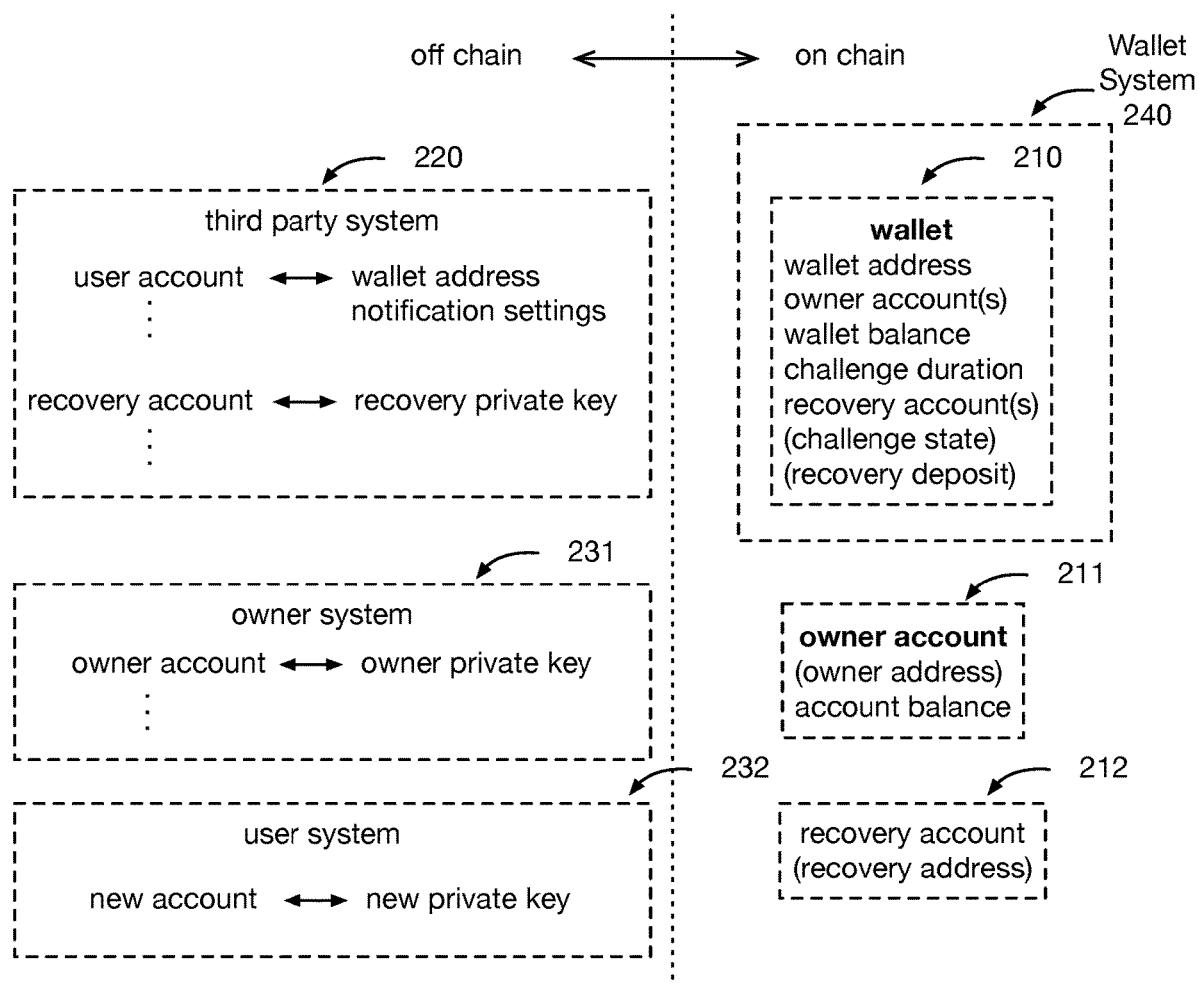
FIG. 2 is a schematic representation of a system for wallet access recovery.

In a second implementation, receiving a wallet recovery request can include receiving a recovery blockchain transaction signed by a private key of a recovery account managed by an authorized third party system (e.g., 220 shown in FIG. 2). The signed recovery blockchain transaction can identify the new public key. The recovery condition can include receiving the blockchain transaction signed by the private key of the recovery account; verifying the signature of the blockchain transaction signed by the private key of the recovery account; and, optionally, expiration of a predetermined challenge period without abort condition satisfaction; but can include any other suitable set of conditions.

In a second variation, the method for wallet recovery includes: receiving a wallet recovery request from a user; verifying the user identity as an owner of the wallet; and transmitting a challenge initiation request to the wallet upon user identity verification.

The challenge initiation request can be signed by a recovery account associated with the wallet, and include: instructions to initiate the challenge period, new public keys (e.g., owner keys; public keys of an asymmetric key pair generated by the user), and, optionally, a recovery deposit (e.g., a deposit required to initiate the challenge period or to send the challenge initiation request, as specified by the wallet).

Upon signed challenge initiation request receipt, the wallet can: temporarily disable all or a subset of wallet capabilities (e.g., disable withdrawal capabilities) for a challenge period (waiting period), temporarily store the new public keys (but not enable transaction signing using the private keys corresponding to the new public keys), and, optionally, deposit the recovery deposit into the wallet (e.g., increment the wallet by the recovery deposit amount). Upon user identity verification and/or signed challenge initiation request transmission, the method can include: periodically notifying one or more wallet owners (e.g., owner account, user or user account associated with the wallet address, device storing a private owner key, etc.) through one or more notification methods (e.g., email, text, push notifications in the owner account, etc.) about the wallet's challenge initiation.

If the wallet owners abort the challenge (e.g., through the notification), the method can include: sending an abort request, signed by the recovery account, to the wallet, wherein the wallet can terminate the challenge process and optionally delete the new keys. When the challenge is aborted, the old keys (e.g., the old private keys paired with the old public keys stored by the wallet) preferably remain capable of signing transactions. If the wallet owners do not abort the challenge, the method can include: replacing the old keys with the new keys, and allowing the user to sign transactions from the wallet using the new keys. The method can optionally include disabling or deleting the old keys from the wallet.

However, wallet access can be otherwise regained.

2. Benefits

Variants of the method confer several benefits over conventional systems.

First, variants of the method use a trusted third-party-managed wallet recovery scheme, which can confer increased redundancy and/or security. In particular, these variants use a recovery agent, held by the third party, which can authorize wallet key changes. These recovery agent capabilities can additionally or alternatively be limited to a predetermined set of actions, such as signing challenge initiation requests and/or signing challenge abort requests, and prevented from performing other actions (e.g., signing wallet transactions, withdrawals, other key actions, etc.). This can function to increase the trust placed by the users in the third party system and can limit the capabilities of an attacker who obtains the recovery agent key(s).

Second, variants of the method notify wallet owner(s) of a wallet recovery operation (e.g., via an authorized third party system), and allow any one owner to abort the wallet recovery operation.

Third, variants of the method use a multi-owner recovery scheme (e.g., using multisig wallet recovery). In particular, these variants use signatures of multiple wallet accounts to perform wallet recovery.

Fourth, variants of the method can use a timelock for a predetermined challenge period, which can temporarily disable certain wallet capabilities (e.g., withdrawal actions) during the challenge period. This can give the owners time to abort the key recovery process (challenge process) if an attacker manages to successfully initiate the challenge process, while minimizing the risk of losing the wallet funds.

Fifth, variants of the method can require a recovery deposit, wherein the recovery deposit is lost (e.g., to the wallet) if the challenge is unsuccessful. If the challenge is successful (e.g., the owner successfully replaces the owner keys in the wallet), the recovery deposit is "returned" to the owner via the now-accessible wallet. This can function to deter attackers from challenging the wallet.

However, the method can confer any suitable set of benefits.

3. System.

As shown in FIG. 2, the method is preferably performed using a system including: a cryptocurrency wallet (e.g., 201) associated with a set of owner accounts (e.g., 211). In some variations, the wallet is associated with a recovery account (e.g., 212). The system can optionally include a third party system (e.g., 220), wherein the third party system hosts the blockchain recovery account (e.g., 212) and user accounts (e.g., off-chain accounts) associated with the blockchain owner accounts (e.g., 211). The method can optionally be used with a digital distributed ledger system (e.g., blockchain, such as Ethereum, ERC-20, Bitcoin, account-based cryptocurrencies, UTXO-based cryptocurrencies, etc.), wherein the cryptocurrency wallet, blockchain recovery account, and/or blockchain owner accounts are part of the distributed ledger system. However, the method can be performed with any suitable system.

In some variations, the third party system (e.g., 220 shown in FIG. 2) is a single-tenant platform. In some variations, the third party is a multi-tenant platform. In some variations, the third party system is a multi-tenant hosted wallet platform that manages blockchain wallets for a plurality of users and at least one type of asset. However, the third party can have any other suitable tenancy architecture.

In some variations, the third party system (e.g., 220) is implemented by one or more computing servers having at least one computer processor (e.g., graphics processor units (GPU), tensor processing unit (TPU), central processing units (CPUs, MCUs, etc.), at least one processor-readable storage medium, and at least one network device, but can additionally or alternatively be a distributed computing system, or be implemented by any other suitable computing system. In some implementations, the network device of the third party system is communicatively coupled to one or more of a network device of a wallet system (e.g., 240), an owner system (e.g., 231), and a user system (e.g., 232) (either directly or indirectly via one or more other systems) via a network (e.g., a private network, a public network, the Internet, etc.). In some implementations, at least one storage medium is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like, but can be any other suitable storage medium. In some implementations, at least one storage medium includes machine-executable instructions, that when executed by a processor of the third party system, control the third party system to perform at least one process of the methods described herein.

The cryptocurrency wallet ("wallet") (e.g., 210) functions to transact cryptocurrency within the distributed ledger system. For example, the wallet can send cryptocurrency from a blockchain address (e.g., user address, wallet address) to a specified endpoint using a transaction (e.g., signed by a private key associated with the address).

The wallet is preferably associated with: a blockchain address (e.g., for the blockchain system), executable code, storage, a cryptocurrency balance, a set of owner accounts that can control wallet operation (e.g., cooperatively or independently), and a set of recovery accounts that can control limited wallet operation (e.g., cooperatively or independently) (specific example shown in FIG. 3), but can additionally or alternatively be associated with any other suitable set of information.

The wallet can be set up by the third party platform, by one or more of the owners, or otherwise created.

Figure 6A:
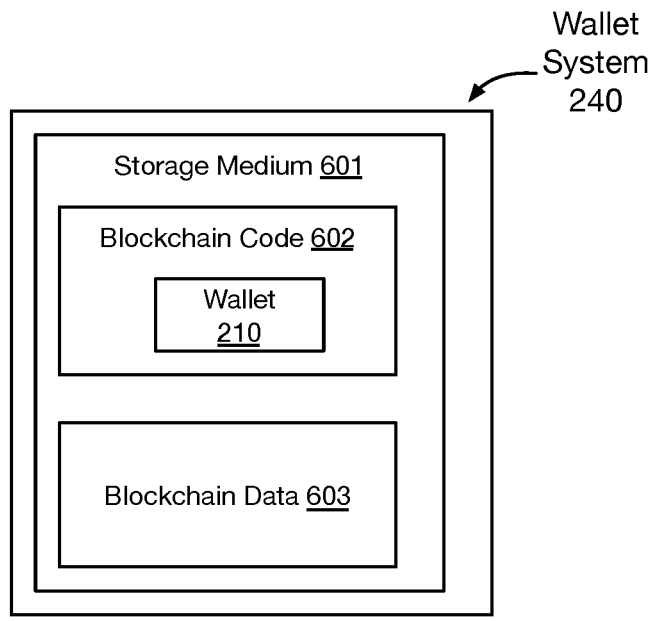
FIGS. 6A and 6B are schematic representations of a wallet system.
Figure 6B:
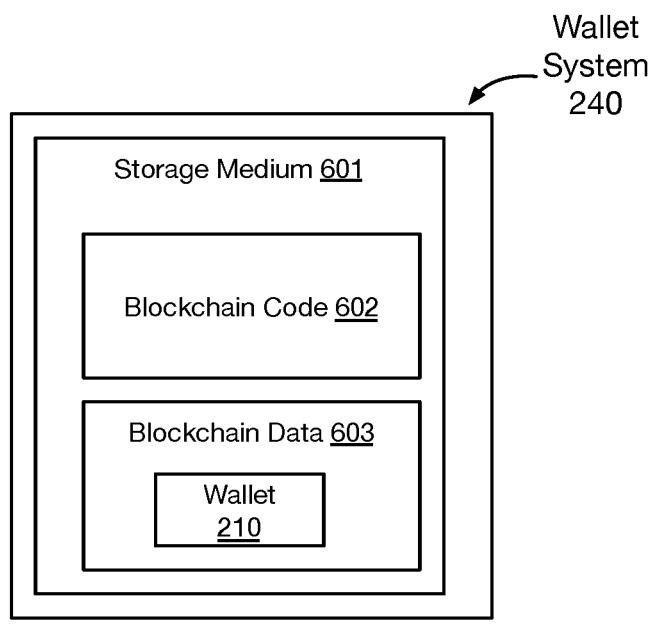

In some variations, the wallet (e.g., 210 shown in FIG. 2) is included in a wallet system (e.g., 240 shown in FIGS. 2, 6A-B) that manages the wallet. In some implementations, the wallet system is a blockchain node. In some implementations, the wallet system is a smart contract system. In some variations, the wallet is a smart contract wallet (as shown in FIG. 6B) in which the code of the smart contract wallet (e.g., 210) is included in blockchain data (e.g., 603). In some variations, the wallet is a blockchain primitive (as shown in FIG. 6A) in which the code of the wallet (e.g., 210) is included in the code (e.g., 602) that implements a blockchain node. In some variations, the wallet is a multi-owner wallet. In some variations, the wallet is a multi-signature wallet. In some variations, the wallet is a single-owner or single-signature wallet.

In some variations, the wallet system (e.g., 240) is implemented by one or more computing servers having at least one computer processor (e.g., graphics processor units (GPU), tensor processing unit (TPU), central processing units (CPUs, MCUs, etc.), at least one processor-readable storage medium (e.g., 601 shown in FIGS. 6A and 6B), and at least one network device, but can additionally or alternatively be a distributed computing system, or be implemented by any other suitable computing system. In some implementations, the network device of the wallet system is communicatively coupled to the one or more of a network device of the third party system, an owner system (e.g., 231) and a user system (e.g., 232) (either directly or indirectly via one or more other systems) via a network (e.g., a private network, a public network, the Internet, etc.). In some implementations, at least one storage medium is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like, but can be any other suitable storage medium. In some implementations, at least one storage medium includes machine-executable instructions, that when executed by a processor of the wallet system, control the wallet system to perform at least one process of the methods described herein. In some implementations, at least one storage medium includes the wallet (e.g., 2100, which includes one or more of executable code of the wallet and data (wallet storage) of the wallet. In some implementations, at least one storage medium includes blockchain code (e.g., 602). In some implementations, at least one storage medium includes blockchain data (e.g., 603).

In a first variation, the wallet (e.g., 220 shown in FIG. 2) is a native wallet that is native to the blockchain system, and the blockchain system (e.g., blockchain code of a blockchain node) defines and implements primitives (e.g., functions, methods) that perform wallet management operations. In some implementations, the native wallet is implemented by blockchain code (e.g., 602 shown in FIG. 6A) that implements a blockchain. In some implementations, the wallet is created by sending a "create wallet" blockchain message to a node of the blockchain system, wherein the blockchain node processes the "create wallet" blockchain message to create wallet data for an on-chain wallet in accordance with a blockchain protocol of the blockchain system and information included in the "create wallet" message. In a first example, the "create wallet" message includes parameters for the native wallet. Parameters can include: wallet owner addresses (e.g., public keys corresponding to private owner keys). In a second example, after creation of the native wallet, parameters for the native wallet are provided to the native wallet via one or more blockchain messages that identify the native wallet and the parameters. In some variations, wallet code of the native wallet (e.g., included in the blockchain code 602 shown in FIG. 6A) is executed by at least one processor of a blockchain node.

In a second variation, the wallet (e.g., 220 shown in FIG. 2) is a contract wallet (e.g., smart contract that can transact cryptocurrency) on the blockchain system. In some implementations, the contract wallet is included in blockchain data (e.g., 603) of a blockchain. In some implementations, the wallet is created by sending a "create contract" blockchain message to a node of the blockchain system, wherein the blockchain node processes the "create contract" blockchain message to create a contract wallet in accordance with information included in the "create contract" message (e.g., according to the corresponding function from the blockchain system's protocol). In a first example, the "create contract" blockchain message includes instructions of the contract wallet (e.g., code to be executed by the blockchain system to perform operations of the contract wallet) and parameters for the contract wallet. In a second example, the "create contract" blockchain message includes instructions of the contract wallet (e.g., code to be executed by the blockchain system to perform operations of the contract wallet), and after creation of the contract wallet, parameters for the contract wallet are provided to the contract wallet via one or more blockchain messages that identify the contract wallet and the parameters. In some variations, wallet code of the contract wallet is executed by at least one processor of a blockchain node.

In a third variation, the wallet is managed by an off-chain wallet system (e.g., a third party system e.g., 220, an owner system 231, a user system 232, a hardware wallet, etc.), and the off-chain wallet system includes an API (Application Programming Interface) that defines and implements methods that perform wallet management operations for wallets managed by the off-chain wallet system. In some implementations, the wallet is created by sending a "create wallet message" to the off-chain wallet system via an API of the off-chain wallet system, wherein the off-chain wallet system processes the "create wallet" message to create a wallet. In a first example, the "create wallet" message includes parameters for the wallet. In a second example, after creation of the wallet, parameters for the wallet are provided to the wallet via one or more API messages that identify the parameters. In some variations, wallet code of the wallet is executed by at least one processor of the off-chain wallet system.

In other variations, the wallet can be any suitable wallet.

Wallet parameters can be received from the owner accounts, received from the recovery account, generated by the wallet system, retrieved from an oracle (e.g., an off-chain database, an on-chain data source), or otherwise determined. Examples of wallet parameters include: a blockchain address (e.g., for the blockchain system), executable code, storage, a cryptocurrency balance, a set of owner accounts that can control wallet operation (e.g., cooperatively or independently; such as public keys, or hashes thereof, corresponding to private keys held by the owners), and a set of recovery accounts that can control limited wallet operation (e.g., cooperatively or independently; such as public keys, or hashes thereof, corresponding to a private recovery key) (specific example shown in FIG. 3), and wallet settings (e.g., challenge time; deposit amount; number of signatures required for a given action, such as withdrawal or new key addition; etc.), but can additionally or alternatively be associated with any other suitable set of information.

Figure 3:
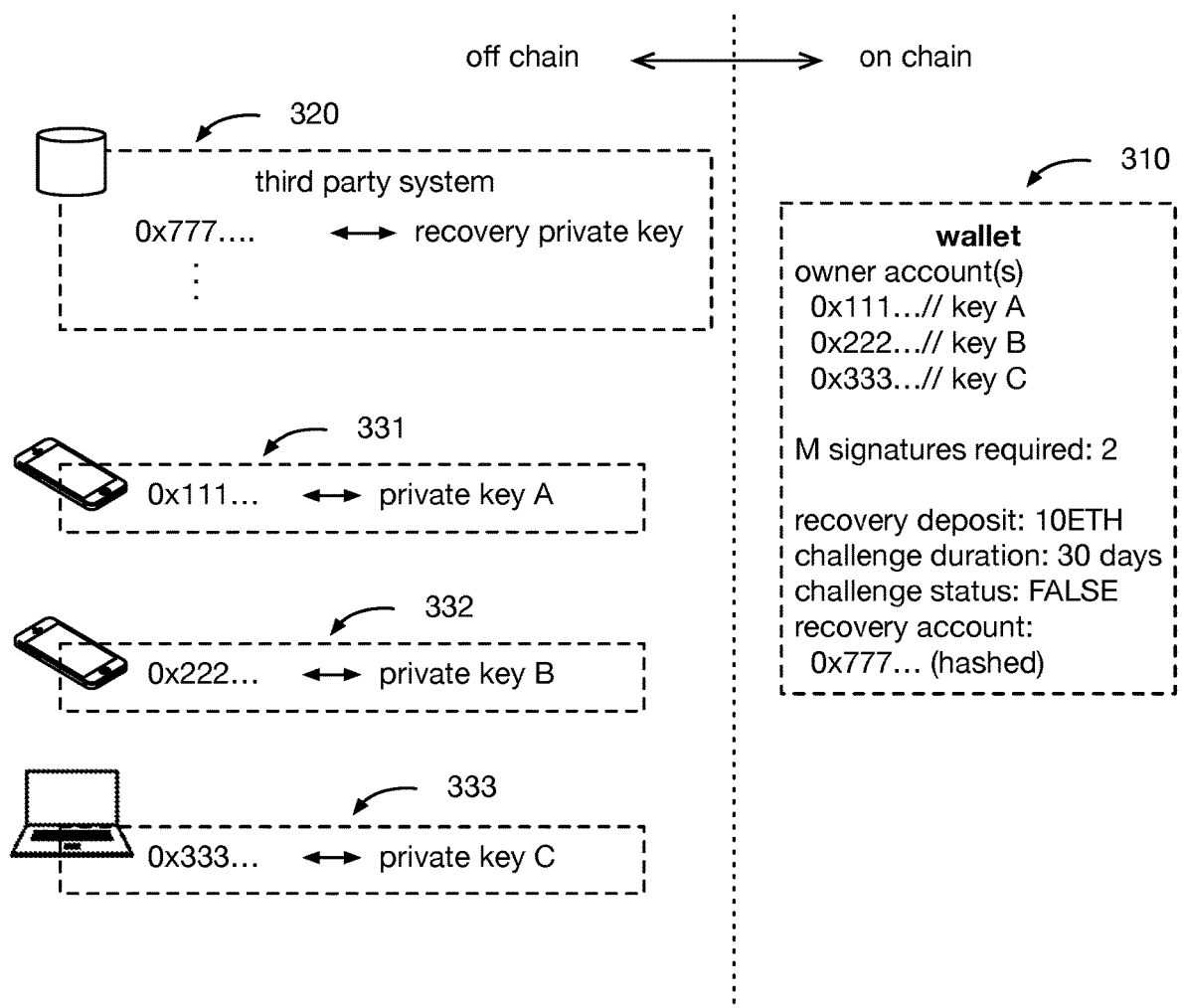
FIG. 3 is an illustrative example of the system.

The wallet (e.g., 210, 310) is preferably associated with one or more blockchain owner accounts ("owner accounts") (e.g., as shown in FIGS. 2 and 3), wherein the wallet can transact cryptocurrency or perform another operation (e.g., change stored information, such as the owner accounts, notification settings, recovery settings, etc.) upon receipt of one or more messages signed by a threshold number of owner accounts (e.g., signed by the private keys of the owner accounts). In one example, the wallet can be owned by a single owner account (e.g., be a single signature wallet). In a second example, the wallet can be a multisignature wallet, wherein signed transactions must be signed by M-of-N owner accounts. Each owner account is preferably the public key of an asymmetric key pair (or hash thereof, wherein descriptions of public keys are equally applicable to hashes of public keys in this application), but can be otherwise configured. The owner accounts can be associated with one or more users and/or user accounts, wherein the association between the owner accounts can be stored on the third party system (e.g., 220), stored by the user account, or otherwise stored. The wallet preferably stores the respective public keys of said owner accounts (and/or hashes thereof), but can otherwise identify the owner accounts. The users ("owners") preferably store the private keys that are paired with the public keys, such as in hardware security modules, cold storage, an owner device (e.g., 231, 232) or otherwise stored. The owner account is preferably an on-chain account (e.g., part of the blockchain system, a blockchain address), but can alternatively be any other suitable account. However, the owner account can be otherwise configured. Each user and/or user account can be associated with one or more owner accounts. Each owner account can be associated with one or more wallets (e.g., be the owner account for one or more contract wallets, native wallets or off-chain wallets). Different wallets preferably have different owner accounts, but can alternatively have the same set of owner accounts.

The wallet (e.g., 210, 310) is preferably associated with one or more blockchain recovery accounts ("recovery account") (e.g., 0x777 shown in FIG. 3), wherein the wallet can be configured to execute a limited set of operations upon receipt of messages signed by the recovery account (e.g., messages signed by the recovery key). For example, the messages signed by the recovery account can: initiate the recovery process, replace owner accounts (e.g., replace the public keys, or hashes thereof, associated with the wallet owners), change notification settings, change recovery settings, and/or perform any other suitable function. In another example, the recovery account cannot sign withdrawal transactions. However, the recovery account can be conferred with any suitable set of permissions to perform any suitable set of functions (e.g., by the contract wallet code, native wallet operations, off-chain wallet operations, etc.). The recovery account(s) are preferably managed by a trusted third party system, such as the third party system (e.g., 220, 230) (e.g., a bank, an exchange, a wallet platform, etc.), but can alternatively be managed by the owner, one or more individuals, or any suitable entity. Each trusted third party system can be associated with (e.g., store the private keys for) one or more recovery accounts. Each recovery account can be associated with one or more wallets (e.g., be the recovery account for one or more contract wallets, native wallets, and the like). Each wallet is preferably associated with one recovery account, but can alternatively be associated with multiple recovery accounts, wherein a recovery message must be signed by M-of-N recovery accounts prior to execution (e.g., wherein M can be 1 or more keys). Different wallets preferably have the same recovery account (e.g., accept requests signed by the same recovery key), but can alternatively have different recovery accounts (e.g., accept requests signed by different recovery keys). Each recovery account is preferably the public key of an asymmetric key pair (or hash thereof, wherein descriptions of public keys are equally applicable to hashes of public keys in this application), but can be otherwise configured. The wallet preferably stores the respective public keys (or hash thereof) of said recovery accounts, but can otherwise identify the recovery accounts. The recovery account is preferably an on-chain account (e.g., part of the blockchain system, a blockchain address), but can alternatively be any other suitable account. However, the recovery account can be otherwise configured.

The recovery key is preferably the private key corresponding to the recovery account (e.g., corresponding to the public key of the recovery account), but can additionally or alternatively be the public key of the key pair, be a symmetric key or be any other suitable key. The recovery key is preferably stored by the third party system (e.g., 220, 320) (e.g., as a hot key, as a cold key), but can be otherwise stored. The recovery key can be stored in hardware security modules, cold storage, or otherwise stored. The recovery key is preferably used to sign the limited set of requests or transactions (e.g., recovery requests, abort requests, wallet creation requests, owner key assignment requests, etc.) permitted to the recovery account, but can be otherwise used. The recovery key is preferably associated with the recovery account of the wallet, and is more preferably the private key corresponding to the public key associated with the recovery account for the wallet (e.g., corresponding to the public key used to generate the recovery account for the wallet), but can be otherwise associated with the wallet's recovery account. The recovery key is preferably a predetermined recovery key (e.g., a shared recovery key, an administrator key, etc.) that is shared as the recovery key for a plurality of wallets (e.g., for different user accounts, owner accounts, etc.), but can additionally or alternatively be a newly-generated recovery key, (e.g., specific to a user account or an owner account, etc.), or be otherwise shared.

The wallet (e.g., 210 shown in FIG. 2) can be set up by the third party system (e.g., 220 shown in FIG. 2), by one or more owners (e.g., owner accounts, owner devices 231, 232), or otherwise created.

In one variation, the third party system (e.g., 220) creates or manages the wallet (e.g., 210). In this variation, the owners (e.g., owner accounts or owner devices 231, 232 shown in FIG. 2, 331-333 shown in FIG. 3) generate an asymmetric key pair, store the private keys of the asymmetric key pair, and transmit the owner public keys (owner accounts) to the third party system (e.g., 220, 330) (e.g., via the owners' user accounts on the third party system). The third party system determines a recovery account (with a corresponding recovery key) for the wallet, and can create the wallet (e.g., by sending a "create wallet" or "create contract" message, as described herein), assign the owner accounts as the wallet owners, and assign selected recovery account as the wallet recovery account. FIG. 3 shows wallet 310 that includes public keys A, B and C generated by owner devices 331, 332 and 333, respectively. The owner devices 331, 332 and 333 transmit their respective public keys to the third party system 320, which creates the wallet 310 and assigns the owner public keys A, B and C as the owners of the wallet S310. The third party system 320 also determines a recovery key (e.g., 0x777) and assigns the public key corresponding to the determined recovery key as the recovery account for the wallet 310.

In a second variation, the owners (e.g., 331-333) create or manage the wallet (e.g., 310). In this variation, an owner generates a set of asymmetric key pairs, receives the recovery account and/or hash thereof (e.g., 0x777) from the third party system (e.g., 320), and creates the wallet (e.g., 310) with the public keys (e.g., A, B, C) of the asymmetric key pairs as the owner accounts, and the recovery account (e.g., 0x777) as the wallet recovery account (e.g., wherein the recovery account is received from the third party system). However, the wallet can be otherwise created. In some implementations, the owner creates the wallet by sending a "create wallet" or "create contract" message, as described herein.

The storage of the wallet functions to store at least one of: wallet code, wallet state, wallet balance, wallet transactions, owner accounts (e.g., old keys, new keys), recovery accounts (e.g., in hashed, encrypted, unhashed, unencrypted, or any suitable format), recovery settings (e.g., challenge time, deposit amount), notification settings (e.g., endpoints, such as user accounts, devices, or addresses, to notify; notification methods; notification frequency; etc.), or any other suitable information. The storage is preferably on-chain (e.g., on the blockchain system), but can alternatively be off-chain. The storage can be distributed, local memory, remote memory, or be any other suitable storage. The storage can be defined by blockchain primitives, code built upon the blockchain (e.g., a smart contract), code executable by an operating system, code executable by a browser, or be otherwise defined.

The wallet functions to perform operations upon occurrence of a trigger event. The operations can be triggered by transactions or messages (calls) signed by (and/or received from) a predetermined set of blockchain accounts (e.g., owner accounts, recovery account), other contracts, or any other suitable endpoint, be triggered by an on-chain event (e.g., wherein the wallet monitors for the on-chain event), or be otherwise triggered. Operations performed by the wallet can include operations of arbitrary complexity (e.g., manipulate its own persistent storage, change its own permanent state, call other contracts, etc.), or can include operations of limited complexity. The wallet is preferably Turing complete, but can alternatively not be Turing complete. The wallet operations can be defined by blockchain primitives, code (machine-executable program instructions) built upon the blockchain (e.g., a smart contract; code extending the native functionality of the blockchain protocol), code executable by an operating system, code executable by a browser, or be otherwise defined.

In one example, the wallet code (e.g., implemented by a contract or implemented as a module within a blockchain node, etc.) can automatically transact cryptocurrency up to a predetermined limit (e.g., a predetermined transaction limit, cryptocurrency amount limit, etc.), wherein any transactions beyond the limit can require one or more signatures from the owner accounts.

In a second example, different pieces of code (machine-executable instructions) can be executed for different transactions, messages, or signatories. For example, withdrawal transactions can be executed when a withdrawal transaction is signed by one or more owner accounts (e.g., signed with the respective private key), and not executed when the withdrawal transaction is signed by one or more recovery accounts. In another example, a recovery process can be initiated when a recovery message is signed by one or more recovery accounts (e.g., signed with the respective private key), and not executed when the recovery message is signed by one or more owner accounts. However, the owner accounts and/or recovery accounts can have any other suitable set of capabilities.

In one variation, the wallet code (e.g., of the wallet 210, 310) can implement a recovery process that functions to recover owner access to the wallet. The recovery process can be associated with: a set of challenge initiation conditions, a challenge period, and a set of challenge termination conditions. However, the recovery process can be associated with any other suitable set of recovery settings. The recovery settings can be: coded at wallet setup, received in a message signed by one or more of the owner accounts, received in a message signed by one or more of the recovery accounts, or otherwise set.

The challenge initiation conditions function to control whether the recovery process is initiated, wherein the challenge initiation conditions must be satisfied before the recovery process is initiated. Examples of challenge initiation conditions include one or more of: receipt of a recovery message signed by one or more of the recovery accounts (e.g., signed by the recovery key(s)) or owner accounts (e.g., signed by the respective owner key(s), signed by a predetermined number of owner key(s)); receipt of a deposit that meets or exceeds a predetermined recovery deposit amount; a lack of transactions signed by an authorized owner account within a predetermined time period; validation that the requesting user is an owner of the account; or any other suitable condition. Satisfaction of the challenge initiation conditions are preferably verified by the wallet (e.g., 210, 310), but can alternatively be verified by the trusted third party system (e.g., 220, 230) or by any other suitable system. The challenge initiation conditions are preferably specified by the owner accounts (e.g., received in a message signed by a threshold number of owner accounts), but can alternatively be specified by a user account (e.g., wherein the wallet receives the challenge period in a message from the user account that is signed by the recovery account, or wherein the wallet receives a message specifying the challenge period and signed by the recovery account, wherein the challenge period is received by the third party system from the user account), specified by default (e.g., be 1 ETH, etc.), specified as a function of the wallet balance (e.g., be a percentage of the wallet balance), or otherwise determined.

The challenge period (waiting period) is preferably a period of time during which the wallet (e.g., 210, 310) monitors for satisfaction of the challenge termination condition, which can give the wallet owner(s) sufficient time to abort the recovery process. Alternatively, or additionally, the third party system (e.g., 220, 320) or any other suitable system performs the monitoring, wherein the third party system can send a signed message to the wallet (e.g., replacement message, abort message) upon challenge termination condition satisfaction. The challenge period preferably extends from challenge initiation to the satisfaction of a challenge termination condition, but can be otherwise defined. The challenge period can be specified at wallet setup, specified with a request signed by the owner keys, specified with a request signed by the recovery key(s), be a predetermined duration (e.g., no challenge period, 30 minutes, 60 minutes, 30 days, 60 days, etc.), or be any other suitable period.

The challenge termination condition functions to determine when the challenge should end, wherein the wallet is either recovered or unrecovered upon challenge termination condition satisfaction. The challenge termination condition (end event) can include satisfaction of: a recovery condition, an abort condition, or any other suitable condition.

The recovery condition functions to control whether the owner accounts are replaced. In particular, the wallet's owner accounts (e.g., key A, key B, key C shown in FIG. 3) are preferably replaced and/or added to the wallet upon satisfaction of the recovery conditions, and not replaced when the recovery conditions are not satisfied. However, the recovery conditions can be otherwise used. Examples of recovery conditions include: challenge duration (waiting period) expiration without abort condition satisfaction; receipt of a replacement message signed by one or more of the recovery accounts associated with the wallet; satisfaction of an accept condition, or any other suitable condition. The accept condition can include: receipt of a replacement acceptance input (e.g., a verified owner indicates that the challenge is authentic and/or initiated by them) at the third party system (e.g., wherein the third party system transmits a replacement instruction signed by the recovery key to the wallet); receipt of replacement instructions, signed by an old owner account (e.g., with an old private key paired with the old owner account), at the wallet; or any other suitable accept condition. In some variations, the method does not accept all or a subset of accept conditions.

Satisfaction of the recovery conditions are preferably verified by the wallet (e.g., 210, 310), but can alternatively be verified by the trusted third party (e.g., 220, 320) or by any other suitable system. The recovery conditions are preferably specified by the owner accounts (e.g., received in a message signed by a threshold number of owner accounts), but can alternatively be specified by a user account (e.g., wherein the wallet receives the recovery conditions in a message from the user account that is signed by the recovery account), specified by default, or otherwise determined.

The challenge duration (waiting period) is preferably stored by the wallet (e.g., 210, 310) and enforced by the wallet, but can be otherwise stored and/or executed (e.g., by the third party system). The challenge duration is preferably specified by the owner accounts (e.g., received in a message signed by a threshold number of owner accounts), but can alternatively be specified by a user account (e.g., wherein the wallet receives the challenge duration in a message from the user account that is signed by the recovery account), specified by default (e.g., 30 days, 1 week, etc.), specified as a function of the wallet balance (e.g., decreases with wallet balance), or otherwise determined.

The abort condition functions to prematurely terminate the challenge period (waiting period), and can function to halt owner account replacement or addition to the wallet. Examples of an abort condition can include: receiving an abort message signed by the recovery address (e.g., recovery key) or one or more owner accounts (e.g., old owner accounts; old owner keys), receiving a transaction signed by a predetermined number of the owner accounts (e.g., old owner accounts, old owner keys), or any suitable abort condition. The abort conditions can be specified by the owner accounts (e.g., received in a message signed by a threshold number of owner accounts), specified by a user account (e.g., wherein the wallet receives the abort conditions in a message from the user account that is signed by the recovery account), specified by default, or otherwise determined.

The challenge period can optionally be associated with a set of challenge settings, wherein the wallet is operated according to the challenge settings during the challenge period. The challenge settings preferably include limited wallet functionalities, wherein the wallet is precluded from executing said functionalities during the challenge period, but can additionally or alternatively include additional wallet functionalities (e.g., notification capabilities) or any suitable set of wallet functionalities. The limited functionalities can include: wallet withdrawal limitations (e.g., limiting the ability to sign overflow transactions over the transaction limit, limiting all withdrawals from the wallet, etc.), wallet transaction limitations (e.g., deposits and withdrawals), wallet setting update limitations, disabling the old keys (e.g., old owner accounts), deleting the old keys, temporarily storing the new public keys (e.g., new owner accounts), or any suitable set of functionalities. The limited functionalities can be specified by the owner accounts (e.g., received in a message signed by a threshold number of owner accounts), specified by a user account (e.g., wherein the wallet receives the challenge settings in a message from the user account that is signed by the recovery account), be set by default, or be otherwise determined.

However, the code can implement any other suitable process.

In some variations, the third party system (e.g., 220, 320) functions to interface between off-chain and on-chain systems, and can function to: create and/or manage wallets, generate and/or host recovery accounts (e.g., store the associated private keys), verify owner identities, associate owner information (e.g., owner accounts, user accounts, identity information, etc.) with wallet information (e.g., wallet addresses), and/or perform any other suitable functionality. Information stored at the third party system in association with a user account (e.g., the account of the user of the owner system 231, the account of the user of the user system 232) can include one or more of: a user identifier, a password, a set of API keys, owner accounts (e.g., owner addresses), wallets (e.g., wallet addresses), notification methods (e.g., email, text, push notifications, etc.), notification endpoints (e.g., user devices, user accounts, etc.), identity information (e.g., biometric information; information from customer identification programs; names to be matched against public lists, such as politically exposed parties or crime lists; driver's license information; passport information; etc.), and/or any other suitable information. The owners preferably interact directly with the wallet (e.g., send signed requests or transactions directly to the wallet), but can additionally or alternatively directly or indirectly interact with the wallet and/or blockchain system through the respective user account (e.g., sign transactions via the user account; submit recovery requests through the user account), or otherwise use the user account.

However, the method can be used with any other suitable systems or set thereof.

4. Method.

As shown in FIG. 1, the method includes at least one of: receiving a wallet recovery request from a user S100; verifying the user identity S200; transmitting a challenge initiation request to the wallet S300; executing the challenge S400; notifying an owner of the wallet S500; providing wallet access to the user when the recovery condition is met S600; and aborting the recovery process when the abort condition is met S700.

The method can be performed in whole or in part by: the third party system (e.g., remote computing system, server system, etc.), the wallet, a distributed system (e.g., blockchain system), a blockchain node, an owner device, a user device, or any other suitable system. In some variations, at least a portion of the method is performed by a third party system (e.g., 220). In some variations, the third party system manages a recovery account of the wallet. In some variations, the third party system is a multi-tenant hosted wallet platform that manages blockchain wallets for a plurality of users and at least one type of asset. In some variations, at least a portion of the method is performed by the wallet (e.g., 210). In some variations, at least a portion of the method is performed by a wallet system (e.g., 240) that manages the wallet. In some implementations, the wallet system is a blockchain node. In some implementations, the wallet system is a smart contract system. In some variations, the wallet is a smart contract wallet. In some variations, the wallet is a blockchain primitive. In some variations, the wallet is a multi-owner wallet. In some variations, the wallet is a multi-signature wallet.

Receiving a wallet recovery request from a user S100 functions to initiate the recovery process. The wallet recovery request is preferably received by the trusted third party (e.g., 220, 320) (e.g., at the third party system), but can be received by an owner, the wallet, or any other suitable entity. The wallet recovery request is preferably received through the third party system (e.g., wherein the user requests the wallet recovery through a logged-in user account associated with the wallet), but can alternatively be dialed in (e.g., wherein the user calls the trusted third party to request the wallet recovery), or otherwise requested. The wallet recovery request is preferably received from a user device (requestor user device) of the user, but can alternatively be received from any other suitable device.

S100 can be performed when: the wallet owner loses all the private owner keys for the wallet; when the wallet owner loses a subset of the private owner keys for the wallet; when the wallet owner loses control over one or more of the private owner keys for the wallet; or upon occurrence of any other suitable trigger event. The user can be any suitable user, since the user is as yet unverified at S100, but is preferably an owner of the account.

Figure 4:
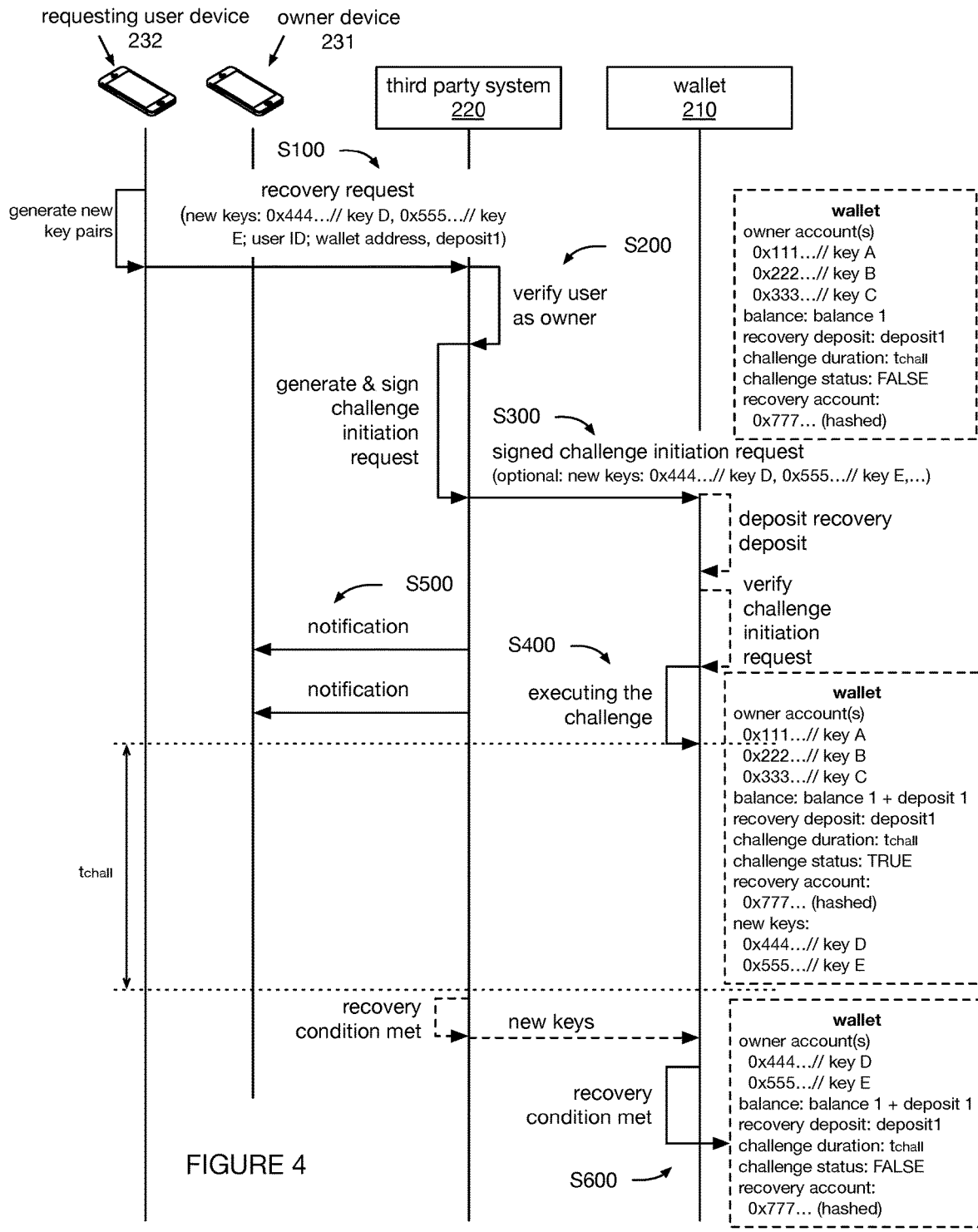
FIG. 4 is an illustrative example of recovering wallet access for a user.
Figure 5:
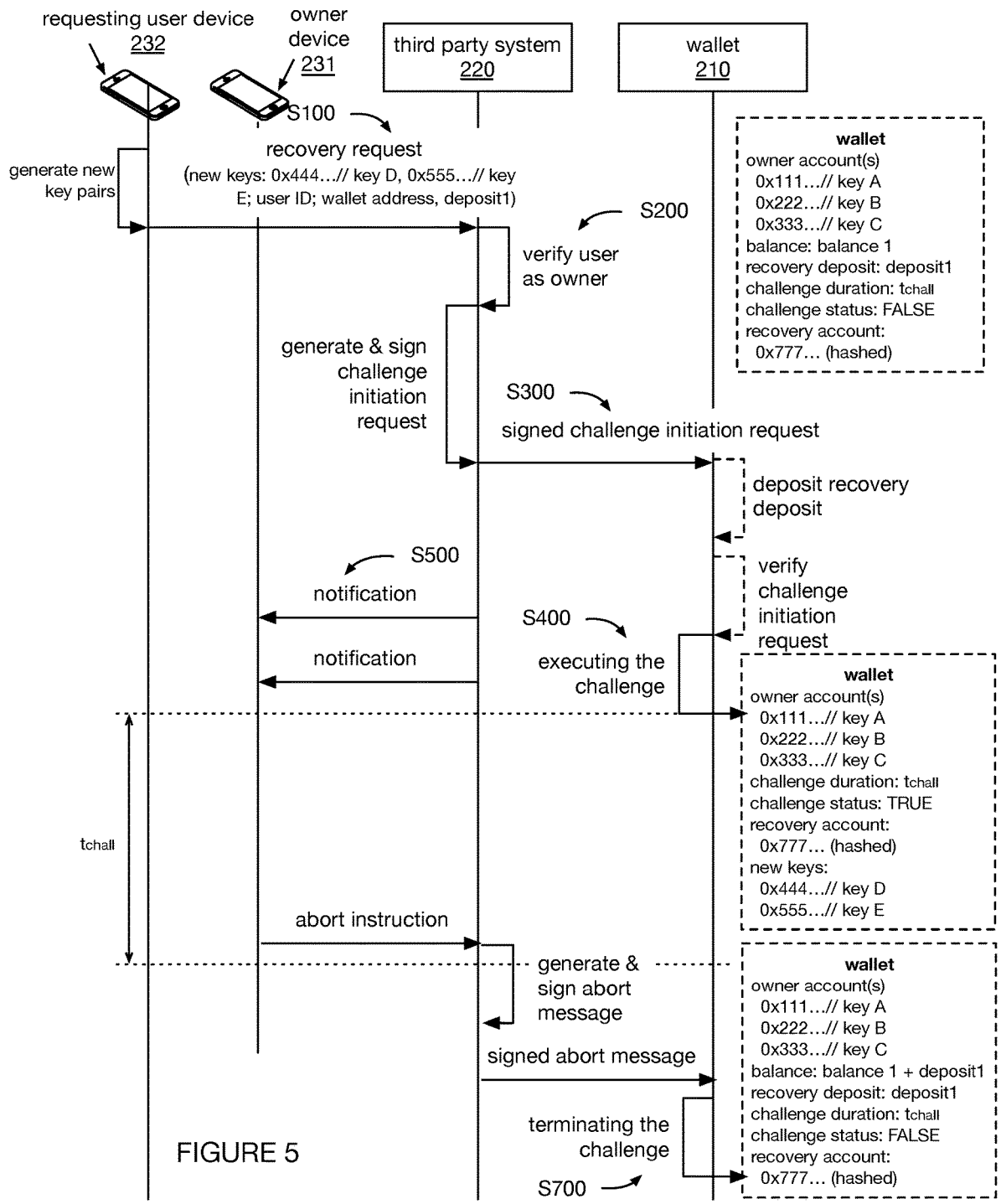
FIG. 5 is an illustrative example of denying wallet access for a user.

The wallet recovery request preferably includes the wallet address, and can optionally include: the user account, the wallet address, user identity information, a recovery deposit, new public keys (owner keys, owner accounts, owner addresses) for the wallet (example shown in FIG. 4 and FIG. 5), challenge settings (e.g., initiation conditions, challenge period, challenge termination conditions), and/or any other suitable information.

The recovery deposit is preferably an amount of cryptocurrency (e.g., number of cryptocurrency tokens), but can alternatively be fiat or be any other suitable format. In one variation, S100 can optionally include exchanging fiat into cryptocurrency acceptable by the wallet prior to transmitting the recovery deposit to the wallet. In a second variation, S100 can include receiving a second currency format (e.g., different from the wallet cryptocurrency), wherein the third party system (e.g., 220, 320) can hold the second currency in escrow until the abort condition or the recovery condition is met. Upon abort condition or the recovery condition satisfaction, the system can automatically transfer the recovery deposit to the owner, return the recovery deposit to the user, exchange the recovery deposit into the wallet cryptocurrency and transfer the recovery deposit to the wallet, or otherwise manage the recovery deposit. However, the recovery deposit can be otherwise received and/or managed.

S100 can optionally include determining the recovery deposit amount. In one variation, the recovery deposit can be a secret amount that only the owner(s) know, wherein the recovery process is only initiated (e.g., by the third party, by the wallet) when the exact required recovery deposit amount is received and/or transmitted to the wallet. In a second variation, the recovery deposit amount can be determined from the wallet (e.g., as shown in FIG. 3). In one embodiment, the recovery deposit amount can be read from a blockchain node hosted by the third party platform and/or a user computing system. In a third variation, the recovery deposit amount is stored by the third party platform, wherein the third party platform returns the recovery deposit amount upon recovery request receipt. However, the recovery deposit amount can be otherwise determined.

The new public keys are preferably generated as part of an asymmetric key pair, wherein the private keys are used to sign future wallet transactions if the recovery condition is met. However, the new public keys can be a symmetric key or be any suitable key. The public keys are preferably generated by the user (e.g., by the user device 232), but can alternatively be generated by the third party system (e.g., wherein the private keys are stored on behalf of the user by the third party system, are transferred to the user, etc.), or otherwise generated. The new public keys can be received as part of the recovery request in S100, or be received later (e.g., after recovery condition satisfaction, as part of S600, requested from the user, etc.).

The wallet recovery request can be: a third party system request, a blockchain request or transaction, or be any other suitable request.

In a first variation, the third party system receives a wallet recovery request, through a third party system interface (e.g., native client, browser application, etc.), from the user account.

In a second variation, the wallet receives at least a predetermined number of signed wallet recovery requests, each specifying the same set of new owner accounts (e.g., public owner keys or hashes thereof), each signed by a different owner key associated with a different owner account stored by the wallet.

Verifying the user identity S200 functions to verify that the user is an owner (or authorized user) of the wallet. S200 is preferably performed using the identity information received with the recovery request (e.g., login credentials), but can alternatively be performed using transaction patterns, platform interaction patterns, or any suitable information. S200 can be performed before and/or after S100, or at any suitable time. The user identity is preferably verified using multiple factors or channels (e.g., out of band verification), but can alternatively be verified using a single factor or channel. For example, the user identity can be verified using: the logged-in user account (e.g., the user account requesting wallet recovery must be associated with the wallet), user device verification (e.g., the user enters the correct code into a user device associated with the wallet), identity documentation (e.g., the provided documentation matches the user identity or credentials associated with the wallet), user credential verification (e.g., for the user account, such as login credential verification, authentication credential verification, valid token verification, etc.), multi-factor authentication (e.g., two-factor authentication) using secondary contact methods and/or devices associated with the user account (e.g., same or different than the requesting device), and/or any other suitable user verification method. However, the user identity can be otherwise verified. S200 can be entirely or partially performed by the third party (e.g., the third party system), a fourth party (e.g., an identity verification entity), or by any suitable system. In some implementations, verifying the user identify includes at least one of verifying login credentials included with the wallet recovery request and performing out of band verification (e.g., multi-factor authentication, such as, for example, two-factor authentication).

The method can optionally include receiving new public keys. The new public keys are preferably added to the wallet or replace the old wallet keys as the owner account(s), which can subsequently give the requestor (e.g., the user) access to the wallet. The new public keys are preferably generated by the users or owners, but can additionally or alternatively be generated by the third party system, or by any other suitable system. The new public keys (and/or hashes thereof) are preferably received by the wallet, but can additionally or alternatively be received by the third party system, or by any other suitable system. The new public keys can be received: with the wallet recovery request (e.g., as part of S100), after user verification (e.g., after S200), or at any other suitable time. In a first variation, the new public keys are received with the wallet recovery request, from the requesting device, at the third party system, wherein the third party system generates and transmits a signed challenge initiation request (e.g., as in S300) that includes the new public keys (e.g., upon user verification). In a second variation, the new public keys are received with the wallet recovery request at the wallet, wherein the wallet recovery request is signed by the owner keys. However, the new public keys can be received by any other suitable endpoint at any suitable time.

Transmitting a challenge initiation request to the wallet S300 functions to instruct the wallet (e.g., 210, 310) to initiate the challenge process. S300 is preferably performed upon verification of the user's identity as a wallet owner or authorized wallet user (e.g., after S200), but can alternatively be performed upon recovery request receipt (e.g., after S100), or at any suitable time. S300 is preferably performed by the third party (e.g., 220, 320) (e.g., third party device, third party system), but can alternatively be performed by a user device (e.g., wherein the signed challenge initiation request is sent from the third party platform to the user device), or by any suitable system.

The challenge initiation request (e.g., signed recovery blockchain transaction, signed recovery request) can include: the wallet address and instructions to the wallet to initiate the challenge process, and can optionally include: the new public keys, the recovery deposit (e.g., a signed transaction to withdraw the deposit from an identified account, such as the requestor's account, from a third party-managed escrow account, etc.), and/or any other suitable information. The wallet address can be: a wallet address specified in the wallet recovery request, a wallet address associated with the user account, and/or any other suitable wallet address. In a specific example in which the recovery deposit is sent as part of the challenge initiation request, the wallet can automatically attempt to withdraw funds from the identified account based on the signed transaction (e.g., transaction signed by the private key associated with the identified account), and can abort or preclude challenge initiation when the transaction fails. Alternatively, the challenge initiation request can not include the new public keys and/or the recovery deposit, wherein the new public keys and recovery deposit can be retained by the third party system (e.g., 220, 320) or other management system.

The challenge initiation request is preferably signed by the recovery account associated with the wallet (e.g., managed by the third party system, managed by another entity, etc.), more preferably by the private key (recovery key) associated with the recovery account (e.g., stored by the third party, such as at the third party system or platform), but can be signed by the owner accounts (e.g., private owner keys), or otherwise signed. In variants, the wallet may require that the challenge initiation request be signed by multiple recovery accounts (e.g., M of N recovery accounts associated with the wallet). In these variants, the same challenge initiation request can be signed by multiple recovery accounts (e.g., wherein the partially-signed challenge initiation request can be transmitted to different clients associated with each recovery account for signatures), or multiple challenge initiation requests, each signed by a different recovery account, can be transmitted to the wallet (e.g., within a predetermined time period), wherein instructions to send the signed challenge initiation requests can be sent to each of the recovery accounts by the third party system or otherwise coordinated. In the latter variant, the wallet can optionally verify that each of the signed challenge initiation requests include the same request (e.g., the same new public keys, the same deposit, the same challenge period, etc.), or otherwise process the request. However, multisignature challenge initiation requests can be otherwise created and transmitted to the wallet.

In some variations, the wallet may require that the challenge initiation request be signed by a predetermined number of recovery accounts (or owner accounts) that is different from a number of wallet owner signatures required for a transaction (e.g., withdraw, send) from the wallet or other wallet function (e.g., more signatures, less signatures), or require that the challenge initiation request be signed by the same number of recovery accounts or owner accounts as that required for other functions.

Transmitting the challenge initiation request to the wallet preferably includes broadcasting the challenge initiation request to the blockchain system (e.g., to a node of the blockchain system, etc.), but the challenge initiation request can be otherwise transmitted to the wallet.

Executing the challenge S400 functions to execute the operations associated with the recovery process or challenge. S400 is preferably executed by the wallet (e.g., 210, 310), more preferably by recovery code (instructions) of the wallet (e.g., code of the blockchain node implementing a native wallet, code of a contract wallet), but can be executed in whole or in part by the third party system, or be otherwise executed.

S400 is preferably executed in response to satisfaction of one or more challenge initiation conditions. In a first variation, S400 executed in response to receipt or validation of the signed challenge initiation request at the wallet (e.g., after the challenge initiation request is confirmed by the blockchain system's nodes; after the challenge initiation request is verified as signed by the recovery key). In a second variation, S400 is similar to the first variation and additionally includes satisfaction of one or more challenge initiation conditions (e.g., correct deposit amount receipt; satisfaction of a threshold number of challenge initiation conditions; satisfaction of a predetermined number of challenge initiation conditions, etc.). In a third variation, S400 is executed based on challenge initiation status change, wherein the challenge initiation status is monitored by the wallet (e.g., wherein the third party system changes the challenge initiation status in response to user identity confirmation). However, S400 can be performed at any suitable time.

In some variations, S400 includes initiating the challenge period (waiting period).

In some variations, S400 preferably includes operating the wallet according to the challenge settings during the challenge period. The challenge settings and challenge duration (e.g., default challenge period) are preferably coded into and/or stored by the wallet, but can alternatively be received in the challenge initiation request, or otherwise determined by the wallet.

Operating the wallet according to the challenge settings preferably includes depositing the recovery deposit into the wallet and limiting the set of operational wallet functionalities during the challenge period, but can additionally or alternatively include operating the wallet in any suitable manner. In one variation, limiting the set of operational wallet functionalities for the challenge period includes limiting all withdrawals from the wallet (e.g., by rejecting all transactions, rejecting transactions signed by the owner accounts, etc). However, wallet functionality can be otherwise automatically or manually changed during the challenge period. However, the wallet can be otherwise operated during the challenge period.

Notifying an owner of the wallet S500 functions to notify a wallet owner that wallet access (or ownership) has been challenged. S500 preferably includes transmitting a notification to a notification endpoint using a notification method. In some variations, S500 includes transmitting a notification at least one owner device (e.g., 231) associated with the wallet, or user device associated with the user account, during the challenge period (waiting period). The notification can include: a challenge initiation notification, a wallet identifier, an abort option (e.g., an abort icon, a set of challenge abort instructions, etc.), an accept option, or any other suitable information. The notification endpoint preferably includes one or more devices (e.g., 231) (e.g., multiple devices) associated with the owner(s) of the wallets, but can additionally or alternatively include: user accounts (e.g., on the third party platform, on secondary platforms, etc.), smart contracts (e.g., on the blockchain system), or any other suitable endpoint. Examples of notification endpoints include: mobile device clients, browser clients, phones, smartwatches, or any suitable endpoint. The notification method can include: email, SMS, push notifications, audiovisual notifications, phone calls, or any other suitable notification method.

The notification endpoint, notification method, and/or notification content associated with a wallet can be determined by the user account associated with the wallet, by the owner, be coded into the wallet, or otherwise determined. The notification settings (endpoint, method, content, frequency, etc.) can be entirely or partially stored by the third party system (e.g., in association with a wallet identifier or address; in association with a user account associated with the wallet address; etc.), by the wallet, or otherwise stored. When the notification settings are stored by the wallet but S500 is performed by another system, S500 can optionally include reading the notification settings off a blockchain node, requesting the notification settings from the wallet, or otherwise determining the notification settings.

S500 is preferably performed in response to S200, but can alternatively be performed before, after, in response to, or contemporaneously with S100, S300, or S400, or at any suitable time. The notification is preferably transmitted during the challenge period or until a challenge termination condition is met, wherein owner notifications cease upon challenge period termination. However, the notification can be transmitted after the challenge period, or for any suitable period of time. In one example, in a case where the user identity identified in the wallet recovery request of S100 is not an owner of the wallet and/or is not associated with the wallet, S500 is not performed.

The notification is preferably sent to the notification endpoint(s): periodically (e.g., at a predetermined frequency, such as once a day, once a week, once a month, etc.), in response to occurrence of a notification event (e.g., threshold time before challenge duration expiration), or at any suitable time. The notification frequency can be set by the owners (e.g., through a user account associated with the wallet, coded into the wallet, etc.), be a default frequency, or be any suitable frequency. In one variation, the notification frequency is determined based on the challenge period (e.g., less frequent notifications for longer challenge periods). In a second variation, the notification frequency is determined based on the wallet balance (e.g., more frequent notifications for higher balances). However, the notification frequency can be otherwise determined.

In one variation, S500 is performed until the challenge duration expires. In a second variation, S500 is performed until an abort condition is satisfied (e.g., the abort option is exercised). In a third variation, S500 is performed until an accept condition is satisfied. Alternatively, S500 can exclude an accept option. However, S500 can be performed until any suitable stop condition is met.

S500 is preferably performed by the third party system (e.g., 220, 320), but can alternatively be performed by the wallet (e.g., 210, 310) or by any other suitable system.

In a first variation, the third party system (e.g., 220, 320) sends the notifications to user devices and/or owner devices (e.g., 231) associated with the user accounts and/or owners.

In this variation, S500 can include, at the third party system: identifying the one or more user accounts (e.g., on the third party system) associated with the wallet (e.g., with the wallet address), identifying the notification settings associated with each of the user accounts, and transmitting the notifications to the notification endpoints (e.g., 231) using the notification methods according to the notification settings.

In a second variation, the wallet (e.g., 210, 310) sends the notifications to user devices and/or owner devices (e.g., 231) associated with the user accounts and/or owners. In this variation, S500 can include, at the wallet, determining the notification settings and transmitting the notifications to the notification endpoints using the notification methods according to the notification settings. Determining the notification settings can include: retrieving the notification settings from wallet storage, extracting the notification settings from the challenge initiation request, retrieving the notification settings from a smart contract (e.g., on the blockchain system) or off-chain source, or otherwise determining the notification settings. However, S500 can be otherwise performed.

Providing wallet access to the user Shoo functions to provide wallet access to the requesting user. Shoo preferably includes activating the new public keys or hashes thereof (new owner accounts, new owner addresses) for the wallet, wherein the wallet and/or blockchain system accepts or validates transactions from the wallet that are signed by the new private keys (new private owner keys) paired with the new public keys (new public owner keys).

Activating the new public keys can include: allowing (e.g., verifying, executing) transactions signed by the new public keys, adding the new public keys to the wallet (e.g., to the set of keys that can sign transactions from the wallet), replacing the old public keys (owner accounts, owner addresses) with the new public keys (example shown in FIG. 4), deleting the old public keys and retaining the new public keys, or otherwise activating the new public keys. The new public keys (or hashes thereof) can be received: as part of the challenge initiation request; as part of a recovery message signed by the recovery account; or otherwise received by the wallet. However, access can be otherwise provided to the requesting user. The new public keys (or hashes thereof) can optionally be stored by the third party system, or not stored by the third party system. The new private keys (e.g., new private owner keys) are preferably stored by the user or owner in a similar manner to old private key storage (e.g., using HSMs, cold storage, user devices, etc.), stored by the third party system, or otherwise stored.

In some variations, Shoo includes updating at least one owner key of the wallet. In some variations, the updated owner key is a public key of an asymmetric key pair. In some variations, the updated owner key is a private key of an asymmetric key pair. In some implementations, the updated owner key is managed by the user device (e.g., 232) that provides the recovery request at S100. In some implementations, the updated owner key is managed by a user device that is different from the user device (e.g., 232) that provides the recovery request at S100.

In some implementations, updating at least one owner key of the wallet includes updating a set of wallet owner keys whose corresponding private keys can be used to sign transactions generated by the wallet. In some implementations, activating the new public keys includes adding each new public key to the set of wallet owner keys. In some implementations, activating the new public keys includes replacing each public key included in the set of wallet owner keys with the new public keys.

S600 is preferably performed when the recovery condition is met, but can alternatively be performed before or at any suitable time. The recovery condition is preferably challenge duration expiration (e.g., waiting period expiration; only challenge duration expiration), but can alternatively be accept condition satisfaction, challenge duration expiration absent satisfaction of an abort message, or be any other suitable condition. Recovery condition satisfaction is preferably determined by the wallet (e.g., when the challenge duration is coded into the wallet), but can alternatively or additionally be performed by the third party system (e.g., when the challenge duration is stored in association with the user account associated with the wallet), be manually determined, or by be otherwise determined.

S600 is preferably performed by the wallet, but can alternatively be performed by the third party system. In a first variation, the wallet automatically activates the new public keys upon recovery condition satisfaction. In a second variation, the third party system transmits a signed recovery message to the wallet in response to recovery condition satisfaction, wherein the signed recovery message includes instructions to activate the new public keys, and can optionally include the new public keys. However, S600 can be performed by any suitable system.

S600 can optionally include returning the recovery deposit to the requesting user. In one variation wherein the recovery deposit has been deposited into the wallet, this includes: receiving a transaction signed with the new private keys specifying all or a portion of the recovery deposit amount and an endpoint address, and, at the wallet, transferring the specified recovery deposit amount to the endpoint address. In a second variation wherein the third party system retains the recovery deposit, this includes: verifying that Shoo has been performed and transferring the recovery deposit back to the requesting user (e.g., to the wallet address from which the recovery deposit was received). Verifying that S600 has been performed can include: determining that a transaction signed by the new private key has been completed from the wallet; determining that the new public keys are the owner account(s) for the wallet (e.g., by reading the owner account information from the blockchain node and matching the owner account information with the new public keys stored by the third party system in association with the wallet address, etc.); or otherwise verifying that Shoo has been performed.

In some variations, Shoo includes providing a user of the requesting user device (e.g., 232) with access to the wallet in response to expiration of the challenge period (waiting period) before satisfaction of an abort condition.

Aborting the recovery process S700 functions to terminate the challenge and to not give wallet access to the requesting user. S700 preferably includes maintaining prior access to the wallet (example shown in FIG. 5), and can optionally include: deleting or ignoring the new public keys; restoring any functionality that was limited during the challenge period; ignoring any messages signed by the recovery account (e.g., except for challenge initiation requests); not sending the new public keys to the wallet; transmitting the old public keys to the wallet; or any other suitable set of processes.

S700 is preferably automatically performed by the wallet, but can alternatively be controlled by the third party system or be controlled by any suitable system.

S700 is preferably performed when the abort condition is met and before the challenge duration has expired, but can alternatively or additionally be performed when the requesting user is invalidated as an owner of the wallet (e.g., the identity verification comes back as false), or performed at any suitable time. Abort condition satisfaction can be determined by the wallet, by the third party system, or by any suitable system. Determining abort condition satisfaction can include: monitoring for abort condition satisfaction (e.g., monitoring the blockchain, monitoring the third party system, etc.) during the challenge period (waiting period) or otherwise determining abort condition satisfaction.

In one variation, determining abort condition satisfaction includes: detecting an owner transaction, signed by an old private key (e.g., a private key paired with the old owner account or owner address), during the challenge process. In this variation, it can be inferred that if an owner account is still being used, recovery of the wallet should be aborted. In one embodiment, this includes receiving the signed transaction at the wallet, wherein the wallet can automatically abort access recovery. In a second embodiment, this includes reading the transaction off the blockchain (e.g., from a blockchain node), and automatically sending an abort message, signed by the recovery account, to the wallet. However, the attempted transaction can be otherwise detected and acted upon.

In a second variation, determining abort condition satisfaction includes: receiving an abort instruction from a user account associated with the wallet (e.g., through one or more of the notifications sent in S500). In this variation, the third party system can: receive the abort instruction, generate an abort message signed by the recovery account (e.g., by the recovery key), and transmit the signed abort message to the wallet.

In a third variation, determining abort condition satisfaction includes: receiving an abort instruction signed by an old private key (e.g., a private key paired with the old owner account or owner address) at the wallet. However, abort condition satisfaction can be otherwise determined. In a first example, this includes: receiving from each of a plurality of owner user devices an abort transaction signed by a private key of the respective owner user device. In a second example, wallet recovery is aborted in response to the signed abort transactions. In a third example, wallet recovery is aborted in response to receiving signed abort transactions from a predetermined number of owner devices (each transaction being signed with a different private key). In examples, the predetermined number is different from a number of wallet owner signatures required to allow a transaction from the wallet.

S700 can optionally include retaining the recovery deposit. In one variation, the wallet retains the deposited recovery deposit in response to abort condition satisfaction determination. In a second variation, the third party system determines that the abort condition has been satisfied and transmits a transaction, depositing the recovery deposit into the wallet and signed by the recovery account, to the wallet. However, the recovery deposit can be otherwise managed.

In some variations, S100 includes receiving at least one signed recovery blockchain recovery transaction that identifies a new public key, and Shoo includes recovering the wallet by adding the new public key to a set of owner accounts that can control wallet operation. The wallet is recovered responsive to at least one signed recovery blockchain transaction.

In a first implementation, S100 includes receiving, from each of a plurality of wallet owner user devices, a recovery blockchain transaction signed by a private key of the wallet owner device. Each signed recovery blockchain transaction identifies the new public key. The recovery condition can include a determination that each signed recovery blockchain transaction identifies the same new public key.

In a second implementation, S100 can include receiving a recovery blockchain transaction signed by a private key of a recovery account managed by an authorized third party system (e.g., 220 shown in FIG. 2). The signed recovery blockchain transaction identifies the new public key. The recovery condition can include receiving the blockchain transaction signed by the private key of the recovery account. Additionally, or alternatively, the recovery condition can include verifying the signature of the blockchain transaction signed by the private key of the recovery account. However, the wallet can be otherwise recovered.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

I claim:

1. A method comprising:
receiving, by a computing device, a signed recovery blockchain transaction, wherein the signed recovery blockchain transaction identifies a first public key of a first owner account that is requesting recovery of a wallet, wherein the signed recovery blockchain transaction is signed by a private key of a recovery account of the wallet, wherein the signed recovery blockchain transaction includes a recovery deposit, and wherein the wallet is configured with a second public key of a second owner account;
causing the recovery deposit to be transferred to an address associated with the wallet;
based on receiving the signed recovery blockchain transaction, initiating a waiting period during which the second owner account is able to abort the recovery of the wallet;
during the waiting period, monitoring for expiration of the waiting period and monitoring for receipt of an abort message that is associated with the second owner account and is signed by the private key of the recovery account; and based on a determination that the abort message has not been received during the waiting period;
configuring the wallet by removing the second public key from the wallet such that the second owner account is removed from a set of owner accounts of the wallet and by activating the first public key such that the first owner account is included in the set of owner accounts of the wallet, and
causing the recovery deposit to be returned.

2. The method of claim 1, wherein after the first public key is activated such that the first owner account is included in the set of owner accounts of the wallet, the wallet allows processing of transactions that are signed with a new private key paired with the first public key.

3. The method of claim 1, wherein the signed recovery blockchain transaction is received from a trusted third party device based on the trusted third party device receiving a recovery request, from a requesting device, that includes the first public key.

4. The method of claim 1, further comprising:
receiving information identifying at least one wallet functionality that is prohibited from being processed during the waiting period; and
during the waiting period, prohibiting the at least one wallet functionality from being processed.

5. The method of claim 4, wherein the at least one wallet functionality includes a withdrawal transaction.

6. The method of claim 1, wherein the first public key is part of an asymmetric key pair generated by a requesting device that is requesting recovery of the wallet, and wherein the asymmetric key pair includes a new private key that is stored by the requesting device.

7. The method of claim 1, further comprising:
during a second waiting period associated with a second attempt to recover the wallet by activating a third public key that is associated with a third owner account, receiving, based on an abort instruction signed by a private key of an owner user device, an indication to abort the second attempt; and
based on the indication to abort the second attempt, aborting the second attempt such that the third owner account is prevented from accessing the wallet.

8. The method of claim 1, wherein monitoring for receipt of the abort message includes monitoring for receipt of a plurality of abort messages associated with a plurality of owner user devices; and
wherein the determination that the abort message has not been received during the waiting period includes a determination that the plurality of abort messages associated with the plurality of owner devices has not been received during the waiting period.

9. An apparatus comprising:
one or more processors; and
memory storing executable instructions that, when executed by the one or more processors, cause the apparatus to:
receive a signed recovery blockchain transaction, wherein the signed recovery blockchain transaction identifies a first public key of a first owner account that is requesting recovery of a wallet, wherein the signed recovery blockchain transaction is signed by a private key of a recovery account of the wallet, wherein the signed recovery blockchain transaction includes a recovery deposit, and wherein the wallet is configured with a second public key of a second owner account;
cause the recovery deposit to be transferred to an address associated with the wallet;
based on receiving the signed recovery blockchain transaction, initiate a waiting period during which the second owner account is able to abort the recovery of the wallet;
during the waiting period, monitor for expiration of the waiting period and monitor for receipt of an abort message that is associated with the second owner account and is signed by the private key of the recovery account; and
based on a determination that the abort message has not been received during the waiting period;
configure the wallet by removing the second public key from the wallet such that the second owner account is removed from a set of owner accounts of the wallet and by activating the first public key such that the first owner account is included in the set of owner accounts of the wallet, and cause the recovery deposit to be returned.

10. The apparatus of claim 9, wherein after the first public key is activated such that the first owner account is included in the set of owner accounts of the wallet, the wallet allows processing of transactions that are signed with a new private key paired with the first public key.

11. The apparatus of claim 9, wherein the signed recovery blockchain transaction is received from a trusted third party device based on the trusted third party device receiving a recovery request, from a requesting device, that includes the first public key.

12. The apparatus of claim 9, wherein the executable instructions, when executed by the one or more processors, cause the apparatus to:

receive information identifying a withdrawal transaction that is prohibited from being processed during the waiting period; and during the waiting period, prohibit the withdrawal transaction from being processed.

13. The apparatus of claim 9, wherein the first public key is part of an asymmetric key pair generated by a requesting device that is requesting recovery of the wallet, and wherein the asymmetric key pair includes a new private key that is stored by the requesting device.

14. The apparatus of claim 9, wherein the executable instructions, when executed by the one or more processors, cause the apparatus to:

during a second waiting period associated with a second attempt to recover the wallet by activating a third public key that is associated with a third owner account, receive, based on an abort instruction signed by a private key of an owner user device, an indication to abort the second attempt; and based on the indication to abort the second attempt, abort the second attempt such that the third owner account is prevented from accessing the wallet.

15. One or more non-transitory computer-readable media storing executable instructions that, when executed by one or more processors, cause an apparatus to:

receive a signed recovery blockchain transaction, wherein the signed recovery blockchain transaction identifies a first public key of a first owner account that is requesting recovery of a wallet, wherein the signed recovery blockchain transaction is signed by a private key of a recovery account of the wallet, wherein the signed recovery blockchain transaction includes a recovery deposit, and wherein the wallet is configured with a second public key of a second owner account;

cause the recovery deposit to be transferred to an address associated with the wallet;

based on receiving the signed recovery blockchain transaction, initiate a waiting period during which the second owner account is able to abort the recovery of the wallet;

during the waiting period, monitor for expiration of the waiting period and monitor for receipt of an abort message that is associated with the second owner account and is signed by the private key of the recovery account; and based on a determination that the abort message has not been received during the waiting period;

configure the wallet by removing the second public key from the wallet such that the second owner account is removed from a set of owner accounts of the wallet and by activating the first public key such that the first owner account is included in the set of owner accounts of the wallet, and cause the recovery deposit to be returned.

16. The one or more non-transitory computer-readable media of claim 15, wherein the executable instructions, when executed by the one or more processors, cause the apparatus to:

receive information identifying a withdrawal transaction that is prohibited from being processed during the waiting period; and during the waiting period, prohibit the withdrawal transaction from being processed.

17. The one or more non-transitory computer-readable media of claim 15, wherein the executable instructions, when executed by one or more processors, cause the apparatus to:

during a second waiting period associated with a second attempt to recover the wallet by activating a third public key that is associated with a third owner account, receive, based on an abort instruction signed by a private key of an owner user device, an indication to abort the second attempt; and based on the indication to abort the second attempt, abort the second attempt such that the third owner account is prevented from accessing the wallet.

18. The one or more non-transitory computer-readable media of claim 15, wherein after the first public key is activated such that the first owner account is included in the set of owner accounts of the wallet, the wallet allows processing of transactions that are signed with a new private key paired with the first public key.

19. The one or more non-transitory computer-readable media of claim 15, wherein the signed recovery blockchain transaction is received from a trusted third party device based on the trusted third party device receiving a recovery request, from a requesting device, that includes the first public key.

20. The one or more non-transitory computer-readable media of claim 15, wherein the first public key is part of an asymmetric key pair generated by a requesting device that is requesting recovery of the wallet, and wherein the asymmetric key pair includes a new private key that is stored by the requesting device.

* * * * *